April 7, 1942.   H. J. NATHAN   2,279,008
HYDRAULIC VEHICLE PROPULSION SYSTEM
Filed July 28, 1938   7 Sheets-Sheet 1
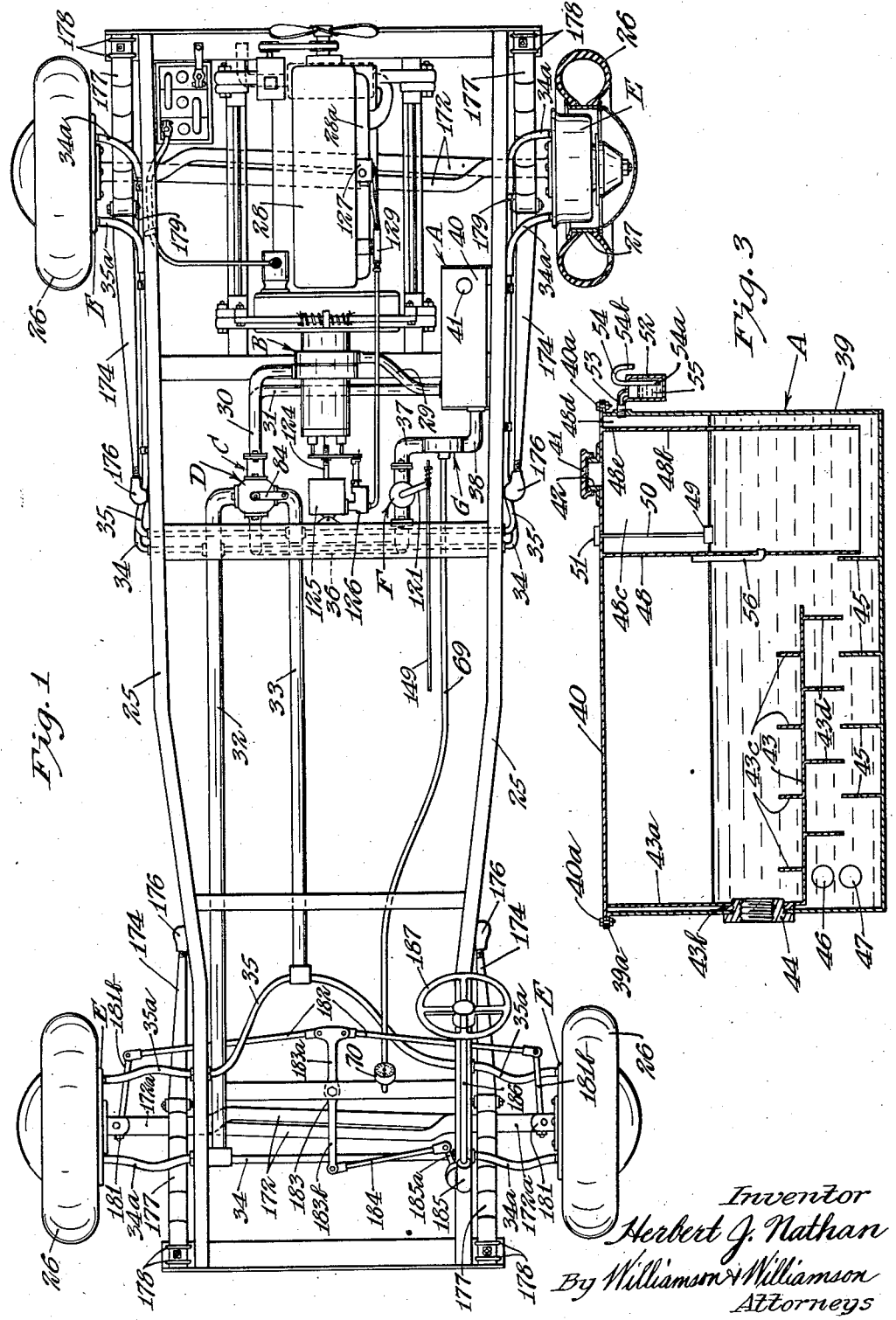

April 7, 1942.  H. J. NATHAN  2,279,008
HYDRAULIC VEHICLE PROPULSION SYSTEM
Filed July 28, 1938  7 Sheets-Sheet 2
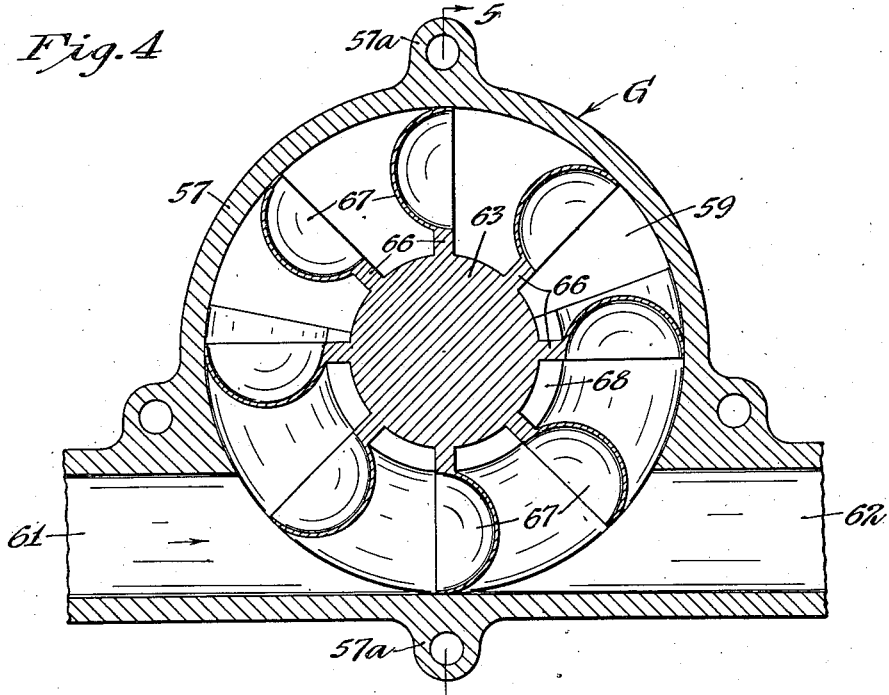
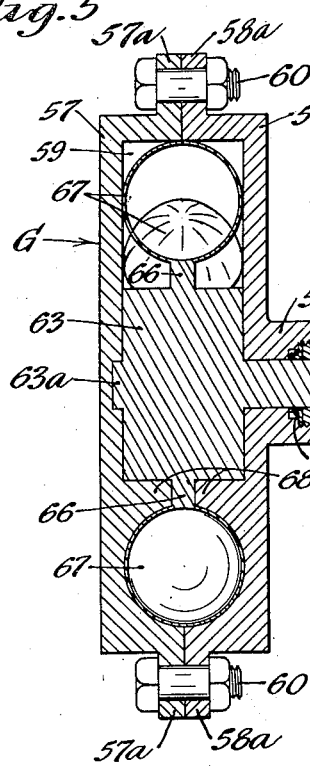
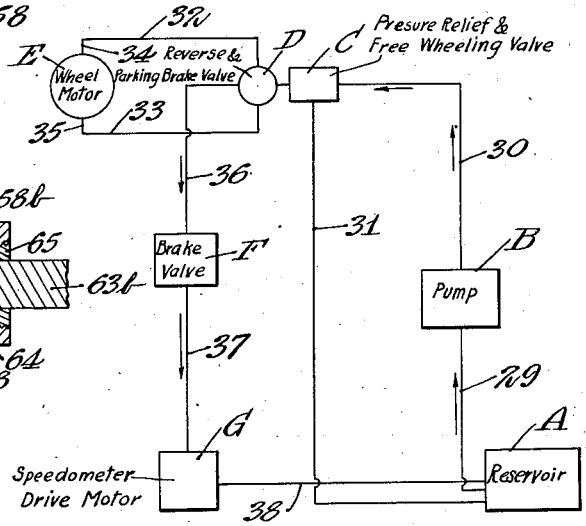
Inventor
Herbert J. Nathan
By Williamson & Williamson
Attorneys April 7, 1942.    H. J. NATHAN    2,279,008
HYDRAULIC VEHICLE PROPULSION SYSTEM
Filed July 28, 1938    7 Sheets-Sheet 3

Inventor
Herbert J. Nathan
By Williamson & Williamson
Attorneys

April 7, 1942.                    H. J. NATHAN                    2,279,008
                         HYDRAULIC VEHICLE PROPULSION SYSTEM
                  Filed July 28, 1938            7 Sheets-Sheet 4
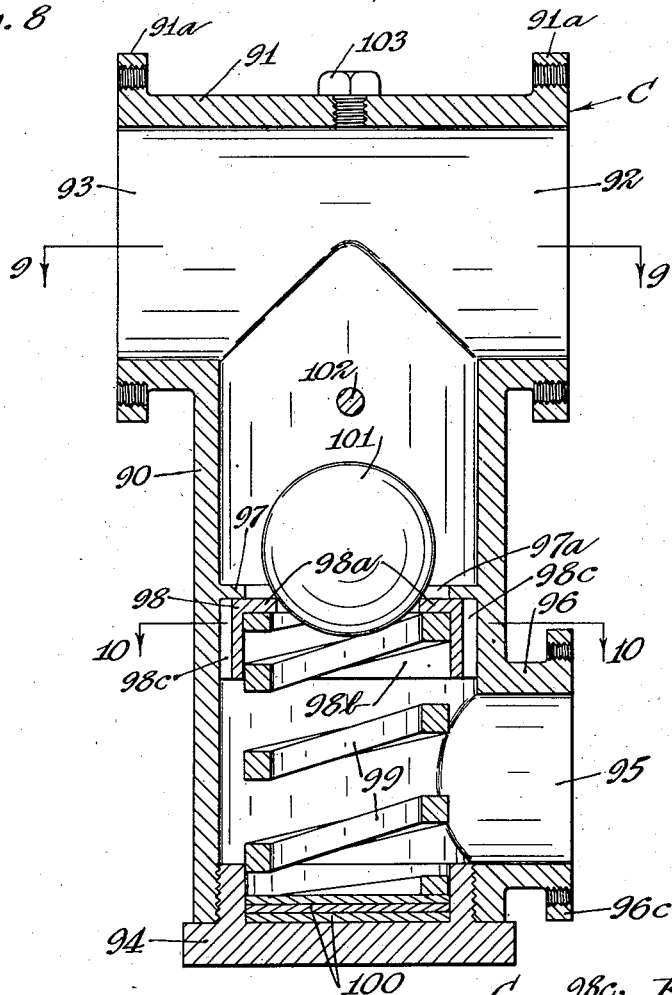
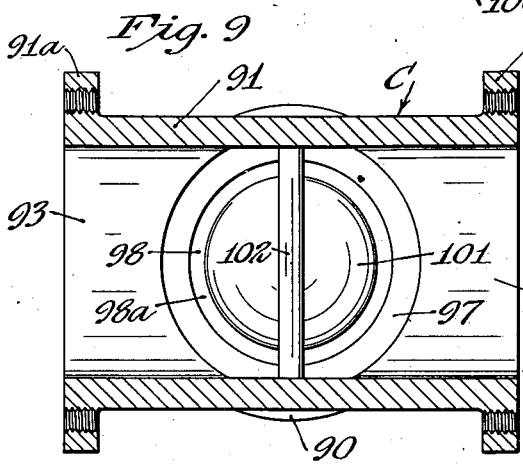
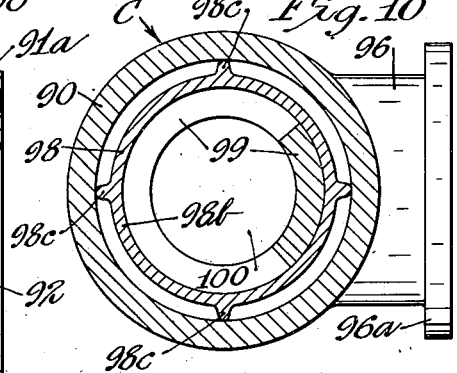
Inventor
Herbert J. Nathan
By Williamson & Williamson
Attorneys

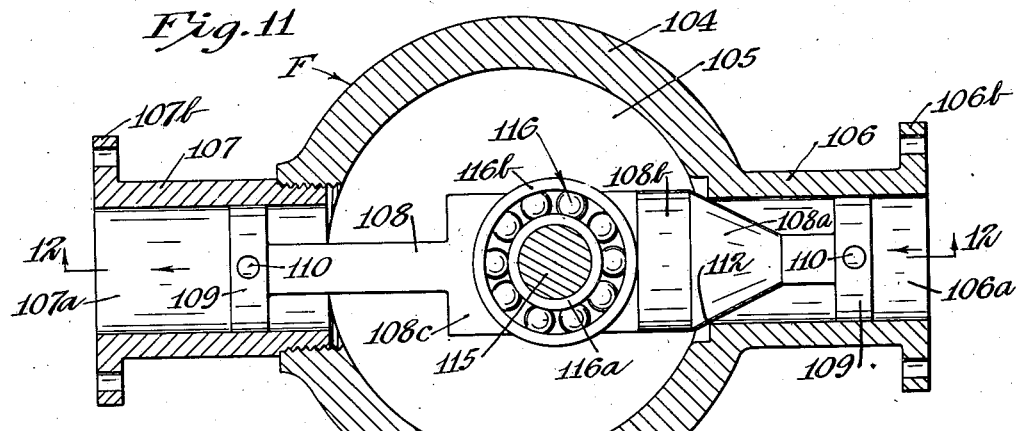

April 7, 1942.     H. J. NATHAN     2,279,008
HYDRAULIC VEHICLE PROPULSION SYSTEM
Filed July 28, 1938     7 Sheets-Sheet 6
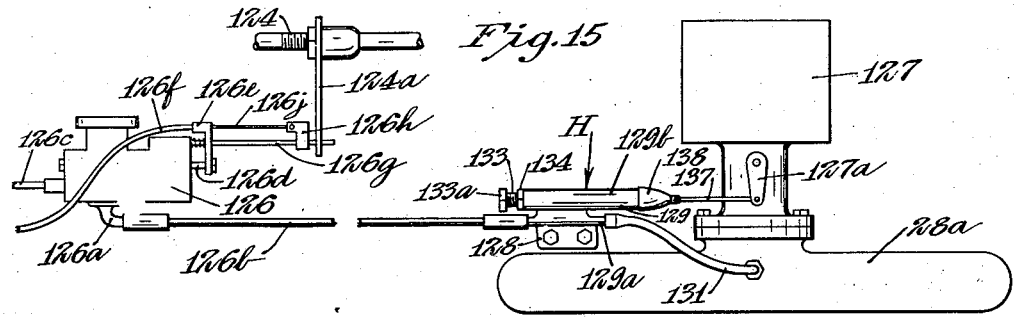
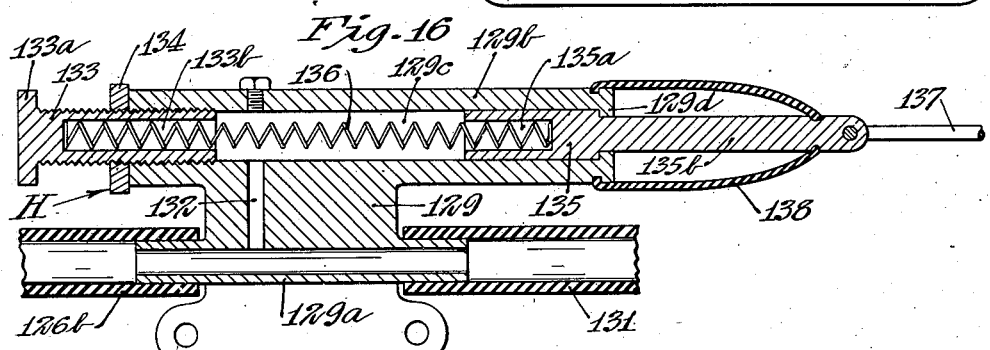
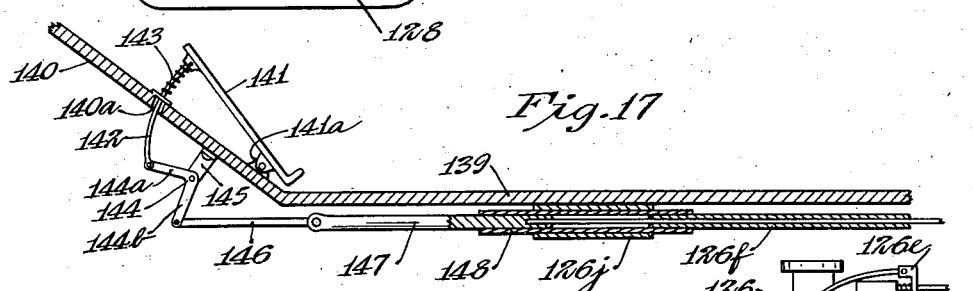
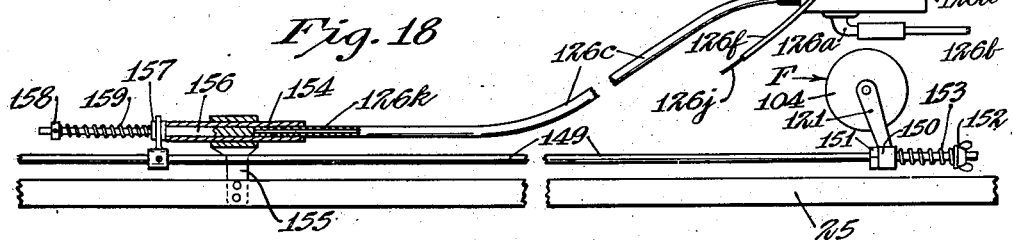
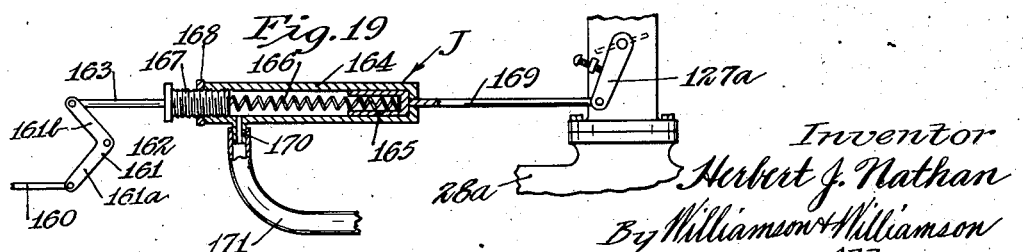
Inventor
Herbert J. Nathan
By Williamson & Williamson
Attorneys April 7, 1942.  H. J. NATHAN  2,279,008
HYDRAULIC VEHICLE PROPULSION SYSTEM
Filed July 28, 1938   7 Sheets-Sheet 7
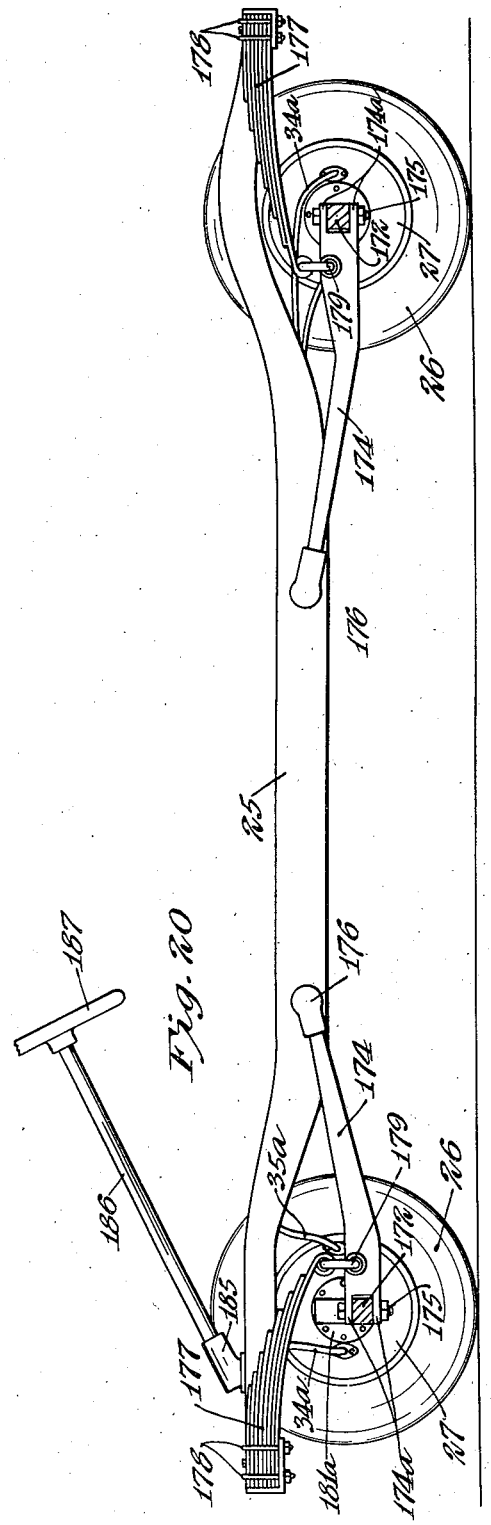
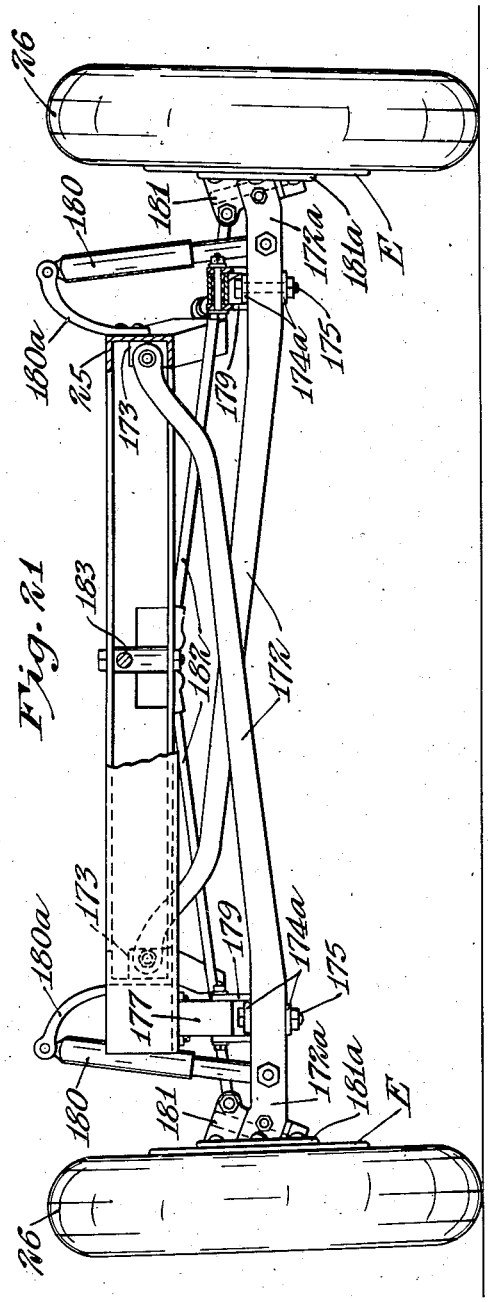
Inventor
Herbert J. Nathan
By Williamson & Williamson
Attorneys Patented Apr. 7, 1942

2,279,008

UNITED STATES PATENT OFFICE 2,279,008

HYDRAULIC VEHICLE PROPULSION SYSTEM

Herbert J. Nathan, Bismarck, N. Dak.

Application July 28, 1938, Serial No. 221,815

2 Claims. (Cl. 60—53)

My invention relates to automotive vehicle propulsion apparatus and particularly to hydraulically operated propulsion apparatus.

A general object of my invention is to provide a co-ordinated hydraulically operated system for propulsion and control of a motor vehicle sufficiently complete to supplant much of and minimize the remaining amount of conventional mechanical equipment ordinarily used for propulsion and control of a motor vehicle and yet afford many of the desirable features ordinarily found in mechanically propelled and controlled vehicles.

A more specific object is to provide a hydraulic system capable of performing or obviating the need of functions conventionally obtained by means of the usual clutch, transmission universal joint, drive shaft, differential, axle shafts, service brakes, parking brakes, free-wheeling device and a speedometer drive means of approximate accuracy.

Another object is to provide such a system enabling an improved type of knee-action wheel suspension for all four wheels of a vehicle, and wheel suspension apparatus suited for a vehicle having such a system incorporated therein.

Yet another object is to provide a system including speedometer drive means enabling approximate indication of rate of travel and recording of distance travelled not only in the forward direction but also in the reverse direction.

Still another object is to provide such a system having a common control element for forward, reverse and parking brake functions.

Another object is to provide such a system having a single device providing for excess pressure release and also affording a free-wheeling effect.

A further object is to provide such a system of simple, compact, light, rugged and inexpensive construction.

These and other objects of the invention will more fully appear from the following description wherein like reference characters refer to the same or similar parts throughout the views, and, in which:

Fig. 1 is a top view of a motor vehicle having an embodiment of my system incorporated therein;

Fig. 2 is a simplified diagrammatic representation of the system illustrated in Fig. 1;

Fig. 3 is a vertical sectional view of the reservoir and settling chamber of my system;

Fig. 4 is a sectional view of the speedometer drive motor of my system taken along the line 4—4 of Fig. 5 as indicated by the arrows;

Fig. 5 is a sectional view of the speedometer drive motor taken along the line 5—5 of Fig. 4 as indicated by the arrows;

Fig. 8 is a sectional view of the excess pressure relief and free-wheeling valve of my system;

Fig. 9 is a sectional view taken along the line 9—9 of Fig. 8 as indicated by the arrows;

Fig. 10 is a sectional view taken along the line 10—10 of Fig. 8 as indicated by the arrows;

Fig. 11 is a sectional view of the service brake valve of my system taken along the line 11—11 of Fig. 12 as indicated by the arrows;

Fig. 12 is a sectional view taken along the line 12—12 of Fig. 11 as indicated by the arrows;

Fig. 13 is a sectional view taken along the line 13—13 of Fig. 12 as indicated by the arrows;

Fig. 14 is a sectional view taken along the line 14—14 of Fig. 12 as indicated by the arrows;

Fig. 15 is a view of one form of control apparatus for a portion of my system;

Fig. 16 is a detail sectional view of one of the devices of Fig. 15;

Fig. 17 is a partially sectional view of control means for another portion of my system;

Fig. 18 is a partially sectional view of control means for still another portion of my system;

Fig. 19 is a partially sectional view of control means corresponding to a portion of that of Fig. 15 but of a somewhat different form;

Fig. 20 is a longitudinal sectional view of a motor vehicle chassis having my wheel suspension incorporated therein; and Fig. 21 is a partially broken away, partially sectional front view of the chassis of Fig. 20.

Figure 6:
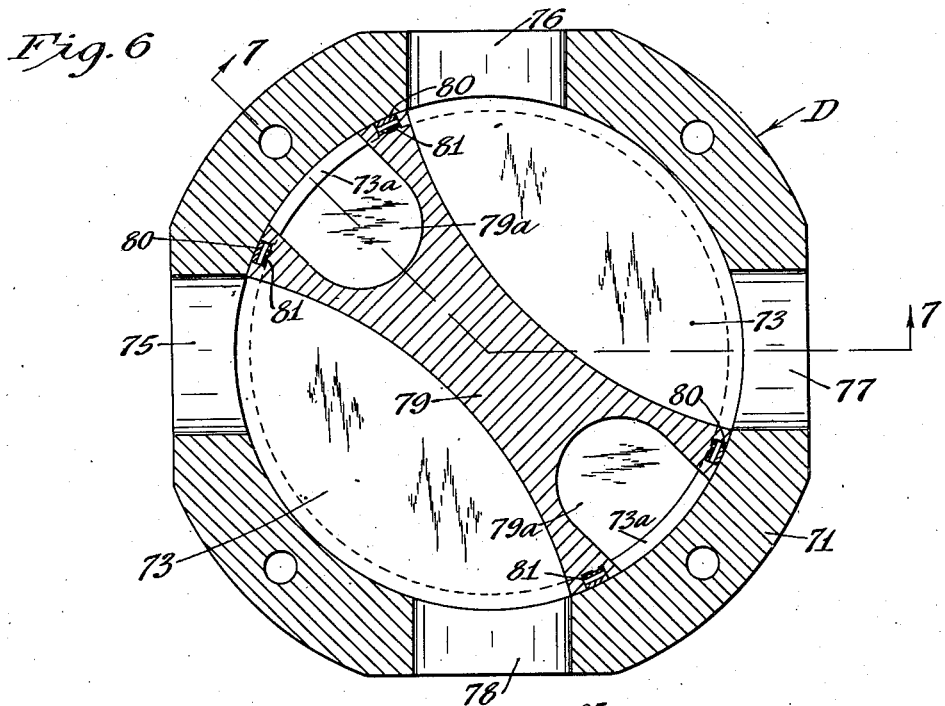
Fig. 6 is a sectional view of the reversing and parking brake valve of my system taken along the line 6—6 of Fig. 7 as indicated by the arrows.
Figure 7:
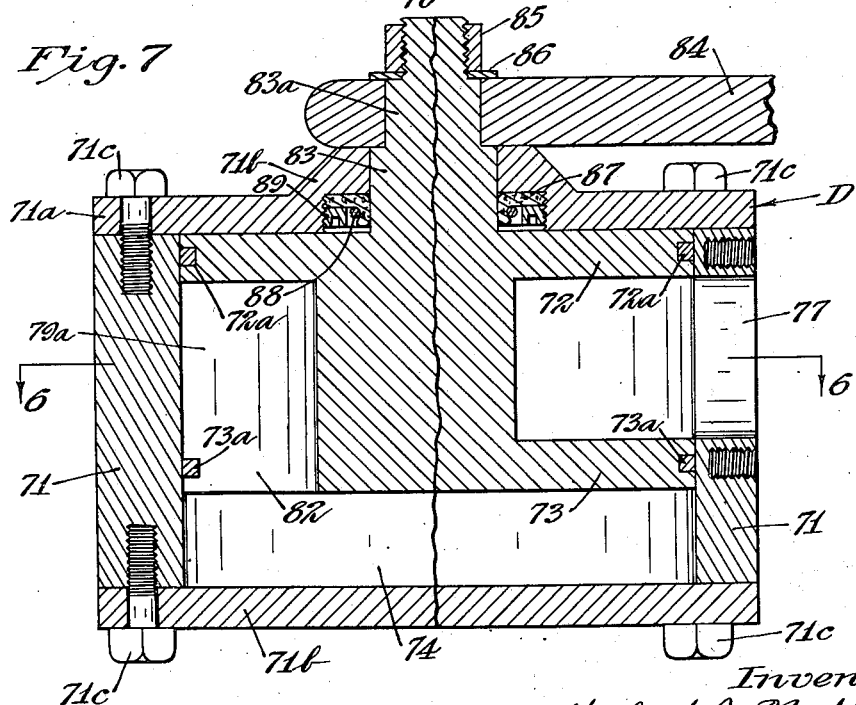
Fig. 7 is a sectional view of the valve of Fig. 6 taken along the line 7—7 of Fig. 6 as indicated by the arrows.

Referring to the drawings Fig. 1 shows a motor vehicle chassis having incorporated therein a hydraulic propulsion and control system constituting an embodiment of my invention. The chassis illustrated includes a frame 25, tires 26, tire rims 27, and an internal combustion engine 28, all of substantially conventional construction. The engine 28 is shown situated in the rear portion of the chassis but may be placed in the forward portion if desired. The engine 28 is, of course, supported from the frame 25 by any means suitable for the purpose.

My propulsion and control system includes a reservoir A, a pump B, an automatic excess pressure relief and free-wheeling valve C, a reversing and parking brake valve D, four hydraulic wheel driving motors E associated with the respective tire rims 27, a service brake valve F, and an auxiliary fluid motor G for driving a speedometer. The fluid pump B may be of any variable capacity type which is controllable to vary the volume of fluid displaced by the same per revolution thereof. Preferably the fluid pump B should be adjustable in capacity throughout the entire range from full capacity down to zero capacity. The driving element of the pump B is connected to the crank shaft of the engine 28.

The above mentioned devices included in my system will be described later in detail. The respective devices are connected together by suitable conduits as shown in Fig. 1 and as indicated in the diagrammatic view of Fig. 2. An outlet of the reservoir A is connected by means of a pump inlet conduit 29 to the inlet of the pump B. The outlet of the pump B is connected by means of a pump outlet conduit 30 to one of the three ports of the automatic valve C. Another port of the valve C is connected through a bypass conduit 31 to the reservoir A. A third port of the valve C is connected to a port of the reversing valve D by mounting the valve C on the valve D with the ports referred to in registration. Two ports of the reversing valve D are connected through wheel motor conduits 32 and 33 to the four wheel driving fluid motors E. Each of the wheel motors E has two individual conduits 34 and 35 respectively connected to the main motor conduits 32 and 33. Portions 34a and 35a of the conduits 34 and 35 extending from points on the frame 25 to the wheel motors E are formed of such material as to be flexible to permit movement of the wheel motor relative to the frame 25 for purposes of spring action and steering. The remaining port of the reversing valve D is connected through the conduit 36 to the brake valve F. Another conduit 37 runs from the brake valve F to the speedometer drive motor G, and still another conduit 38 runs from the speedometer drive motor G to the reservoir A.

The reservoir A includes an open topped tank 39 having an outwardly projecting flange 39a extending around its upper edge and to which a top cover or closure plate 40 is secured by suitable means such as the bolts 40a. The cover plate 40 is provided with a filler cap 41 normally carried by a filler neck 42 as shown. Within the left-hand portion of the tank 39 a plate 43 is provided disposed in a horizontal plane spaced above the bottom of the tank 39 a substantial distance. The left-hand end of the plate 43 is provided with a vertically projecting extension 43a of the plate 43. The vertical portion 43a of the plate 43 is provided with an apertured boss 43b in registration with which the left-hand side of the tank 39 is apertured. A flanged centrally apertured plug 44 is externally screw-threaded and is screwed into internal screw-threads formed in the boss 43b so as to secure the portion 43a of the plate 43 to the tank 39 for support therefrom. The plug 44 constitutes a fluid inlet connection element to which the conduit 38 is connected. The plate 43 is provided with upwardly projecting fins 43c on its upper side and downwardly projecting fins 43d on its lower side, all of these fins being spaced from each other and disposed in vertical planes extending transversely of the tank 39. The bottom of the tank 39 is provided with upwardly projecting fins 45 arranged to project a slight distance into the spaces between adjoining ones of the fins 43d. The tank 39 is provided in the lower left-hand portion thereof with apertures 46 and 47 placed in communication with the respective pump inlet and bypass conduits 29 and 31. It is to be noted that the aperture 46, which is in communication with the inlet of the pump B through the conduit 29, is situated at a higher level than the aperture 47 which is connected to the bypass valve C through the conduit 31 and through which fluid flow in the fluid circulation path that is in effect during coasting and braking operations of the system. This relation between the levels at which the apertures 46 and 47 are respectively situated is such that, should the fluid level in the reservoir A become abnormally low, supply of fluid through the pump inlet conduit 29 for propulsion purposes will fail and prevent propulsion of the vehicle while a supply of fluid through the conduit 31 to the fluid circulation circuit involved in braking operations is still available. This arrangement provides an automatic safety feature whereby the propulsion function of the system will fail before the braking function is impaired in cases where the depth of fluid in the reservoir A recedes below normal due to leakage or any other cause. The fins 43c, 43d and 45 are for the purpose of facilitating the settling of particles of material from fluid entering the reservoir 39 through the inlet plug 44 and leaving the reservoir 39 through either of the conduits 29 or 31. The fins 43d and 45 force the fluid to follow a zigzag path tending to improve the settling action. The spaces between the fins 43c and the spaces between the fins 45 constitute pockets for receiving particles which have settled. In the right-hand portion of the tank 39 two spaced vertical partitions 48 and 48b are disposed transversely of the tank 39, to provide therewithin a chamber 48c between the partitions 48 and 48b and another chamber 48d between the partition 48b and the right-hand end of the tank 39. An aperture 48e is formed in the upper portion of the partition 48b to provide for passage of air between the chambers 48c and 48d. An L-shaped tubular element 56 is attached to the left-hand side of the partition 48 with its lower portion extending through an apertured portion of the partition 48. The tube 56 is open at its ends. The right-hand one of the fins 45 on the bottom of the tank 39 is in close proximity to but slightly spaced from the lowermost portion of the partition 48. The partitions 48 and 48b may be secured to the cover plate 40 for support therefrom and at their vertical edges should fit tightly against the sides of the tank 39. Suitable means for indicating the level of the fluid in the tank 39 is provided and may consist of a float 49 connected through a rod 50 to a suitable fluid level indicating device 51 situated on the upper surfaces of the top cover 40. A breather device for admitting air into the tank 39 and permitting exit of air from the tank 39 is provided. This device consists of a small casing 52 connected at its upper end through a small conduit 53 to the upper portion of the chamber 48d. The casing 52 includes a generally U-shaped tube 54 having one leg 54a thereof extending downwardly into the interior of the casing 52 to a point slightly above the bottom of the casing 52. The remaining leg 54b of the tube 54 projects downwardly exteriorly of the casing 52. The casing 52 is filled to a point somewhat below the upper limits thereof with liquid 55.

The speedometer drive fluid motor G is illustrated in Figs. 4 and 5 and includes a casing comprising two members 57 and 58 placed together to define an interior space 59 of generally cylindrical shape. The respective halves 57 and 58 of the casing are provided with ears 57a and 58a which are apertured and which are held together by means of nutted bolts 60. The lower portions of the members 57 and 58 are extended and recessed to provide therewithin axially aligned respective inlet and outlet passages 61 and 62. Within the interior space 59 a rotor 63 is provided. The rotor 63 is centered relative to the cylindrical space 59 and is of cylindrical shape and of such dimensions as to substantially fill the central portion of the space 59. As viewed in Fig. 5 the rotor 63 has a cylindrical projection 63a centrally located on the left-hand side thereof and journalled in a suitable recess in the member 57. The right-hand side of the rotor 63 has a cylindrical extension 63b constituting a power output shaft for the motor. The member 58 is provided with a boss 58b apertured to constitute a bearing wherein the shaft 63b is journalled. The outer side of the boss 58b is recessed to receive a sealing ring 64 and internally screw-threaded to receive a centrally apertured externally screw-threaded plug 65 for retaining the sealing ring 64 in place. The rotor 63 carries thereon an annular series of equally spaced radially projecting arms 66 on the free ends of which are carried respective hemispherical cups 67. Each cup 67 is disposed within the open side thereof facing the convex side of the adjoining cup 67, and the cups 67 also are positioned so that the open side of the cups at the lower side of the rotor 63 face the inlet passage 61. A pair of arcuate elements 68 are carried or formed on the members 57 and 58 and are so shaped and situated and of such dimensions as to extend between the sides of the arms 66 and the planes in which the end faces of the rotor 63 are disposed. The elements 68 are provided for the purpose of minimizing flow of fluid past the arms 66 into the upper portion of the space 59. Obviously fluid entering the motor G through the inlet 61 and leaving the motor G through the outlet 62 will engage the cups 67 to produce counter-clockwise rotation of the motor 63 as viewed in Fig. 4. The rotor shaft 63b may be connected through a conventional flexible speedometer drive shaft 69 to a conventional speedometer 70 as indicated in Fig. 1. The conduit 37 shown in Fig. 1 and indicated in Fig. 2 is, of course, placed in communication with the inlet passage 61 and the outlet passage 62 is placed in communication with the conduit 38 of Figs. 1 and 2.

The reversing and parking brake valve D includes a casing 71 of which the top and bottom walls 71a and 71b are removable and are normally held in place by means such as the cap screws 71c. The interior space of the casing 71 is cylindrical in shape. Within the interior of the casing 71 and immediately adjacent the wall 71a is a disk 72 having the periphery thereof annularly grooved and provided with an annular sealing element 72a provided in the groove. A disk 73 is provided within the casing 71 in somewhat spaced relation with the wall 71b so as to provide an auxiliary chamber 74 between the disk 73 and the wall 71b. The disk 73 is provided with an annular groove in its periphery and an annular sealing element 73a disposed in the groove. The disks 72 and 73 are disposed parallel to each other in co-axial relation with the casing 71. The casing 71 has therein ports 75, 76, 77 and 78 disposed in equally spaced relation to each other as shown in Fig. 6. The ports 75, 76, 77 and 78 are aligned with the space between the disks 72 and 73 so as to be in communication with said space. A vane 79 extending diametrically of the casing 71 from one side to the other thereof extends between the disks 72 and 73 and may be formed integrally therewith. The ends of the vanes 79 are widened and are provided with outwardly facing recesses 79a therein suited for registration with ones of the ports 75, 76, 77 and 78 with which the ends of the vanes 79 may be aligned. At each side of the recess 79a the vane 79 is provided at its outer end with grooves extending between the sealing elements 72a and 73a and having therein sealing elements 80 bearing against the interior periphery of the casing 71 and urged against said periphery by means of flat arched springs 81 situated in the grooves inwardly of the sealing elements 80. The disk 73 is provided with apertures 82 therethrough in registration with the recesses 79a so as to place the recesses 79a in communication with each other through the auxiliary chamber 74. The disks 72 and 73 and the vanes 79 are adapted for rotation within the casing 71 as a unit. For imparting rotation to the rotatable parts a shaft-like operating element 83 is formed on the outer side of the disk 72 in co-axial relation therewith and is journalled in a bossed and apertured central portion 71b of the wall 71a. The operating element 83 projects beyond the bossed portion 71b to include a reduced diameter portion 83a on which an operating lever 84 is mounted. The operating lever 84 is secured in place on the operating element 83 by means of a nut 85 applied to a screw-threaded free end portion of the operating element 83. A washer 86 is interposed between the nut 85 and the lever 84. Sealing means is provided to prevent leakage of fluid through the joint between the operating element 83 and the bossed portion 71b. This sealing means consists of a flanged washer 87 having the flange portion thereof disposed against the operating element 83 and having a contract element for maintaining the flange portion in firm engagement with the element 83. The sealing element 87 is disposed within a recess on the inner side of the bossed portion 71b and is secured therein by an externally screw-threaded ring 89, which is engaged with internal screw-threads formed in the recesses. The ports 75 and 77 of the above described valve are connected respectively to the conduit 36 and the automatic valve C. The ports 76 and 78 are connected to the motor conduits 32 and 33. With the vanes 79 positioned as shown in Fig. 6 fluid from the pump B may pass through the ports 77 and 76 to the motor conduit 32, and fluid returning from the motors through the conduit 33 may pass through the ports 78 and 75 into the conduit 36. If the vane 79 is rotated through an angle of 90°, fluid from the pump B may pass through ports 77 and 78 into motor conduit 33, and fluid returning from the motors through conduit 32 may pass through ports 76 and 75 to the conduit 36. Obviously the direction of flow of fluid through the motor will be in one direction when the vane is in one of the above mentioned positions, and will be in the opposite direction when the vane 79 is in the other of the above mentioned positions thereof. If the vane 79 is disposed in an intermediate position on the common axis of the ports 75 and 77 flow of fluid in the conduits 32 and 33 will be blocked. Also fluid will be bypassed from the pump B through the port 77, the recess 79a aligned therewith, the auxiliary chamber 74, the remaining one of the recesses 79a, and the port 75 into the conduit 36 wherefrom the fluid may return to the inlet of the pump B. Also the vane 79 may, if desired, be placed in a second intermediate position 90° from the above mentioned intermediate position and disposed along the common axis of the ports 76 and 78. In this case fluid from one of the motor conduits will be bypassed directly to the other one of the motor conduits 32 and 33, thus providing free circulation of fluid through the motor as might be required in cases where the vehicle is moved by means other than its own power plant. Also with the vane 79 in the last mentioned intermediate position the path for fluid from the pump B through the valve D will be blocked.

Figs. 8, 9 and 10 illustrate the automatic excess pressure relief and free-wheeling valve C. The valve C includes a casing comprising a vertically disposed tubular element 90 joined to and in communication with the medial portion of the lower side of a second tubular element 91. The respective ends of the tubular element 91 are each provided with an apertured and internally screw-threaded flange 91a for purposes of connection to other portions of the system. The respective ends of the element 91 also constitute ports 92 and 93 which are respectively connected to the conduit 30 and to the port 77 of the reversing valve D. The lower end of the vertical tubular element 90 is closed by a closure cap 94 which is screw-threadedly secured therein. Somewhat above the lower limit of the vertical tubular element 90 a third port 95 is provided, this port 95 being defined by a tubular member 96 attached to and in communication with the interior of the lower portion of the vertical tubular element 90. The outer end of the tubular member 96 is provided with an apertured internally screw-threaded flange 96a which is attached to the conduit 31. An internally projecting annular flange 97 is formed in the interior of the tubular element 90 a moderate distance above the port 95. The flange 97 constitutes a centrally apertured partition between the lower and upper portions of the interior of the vertical tubular element 90. Below the apertured partition 97 there is provided a ring-like element 98 of somewhat larger diameter than the aperture 97a of the partition 97. The ring element 98 has an inwardly projecting annular flange 98a formed thereon. A helical compression spring 99 is placed under pressure between the flange 98a and a series of disks 100 carried by the upper side of the closure cap 94. A ball 101 is placed above the ring member 98 to cooperate with the flange 98a thereof in forming a check valve. With the aperture 98b defined by the free edge of the flange 98a closed by the ball 101, the flange 98a and the ball 101 co-operate with the flange 97 to form a second check valve. To prevent movement of the ball 101 beyond a reasonable distance above the flange 98a a pin 102 is secured to and disposed diametrically of the upper portion of the tubular element 90 as shown. To maintain the ring element 98 in centered relation with the tubular element 90 vertically extending guide ribs 98c are provided on the exterior periphery thereof. Adjustment of the tension of the spring 99 may be effected by increasing or decreasing the number of disks 100. For purposes of bleeding air from the interior of the valve C the upper side of the horizontal tubular element 91 is provided with a screw-threaded and headed plug 103 screwed into a suitable internally screw-threaded apertured portion of the tubular element 91. In operation of the device an excess pressure existing in the upper portion of the tubular element 90 will force the ball 101 and the flange 98a downwardly against the pressure of the spring 99 to separate the flange 98a from the flange 97 and thus allow fluid to flow past the flanges 97 and 98a downwardly and out through the port 95 into the bypass conduit 31. The spring 99 is sufficiently strong to prevent bypassing of fluid under conditions where normal operating pressures exist in the upper portion of the valve C. The ball 101 will rise from its seat responsive to any fluid pressure below the ball 101 in excess of the fluid pressure above the ball 101. In cases where the vehicle is in motion and the pump B is adjusted to change its output to a reduced amount or to zero the motors E would be driven by the wheels of the vehicle and would begin to function as pumps. If flow of fluid responsive to pumping action of the motors E should be blocked the speed of the vehicle would be slackened rapidly or even abruptly. However, the ball 101 will be lifted to permit circulation therepast of fluid pumped by the motors E. With freedom for circulation of fluid pumped by the motors E a free-wheeling effect is obtained and the vehicle will not be slackened in speed rapidly or abruptly due to reduction or stoppage of the output of the pump B.

Figs. 11 to 14 inclusive illustrate means for restricting and, if desired, stopping flow of fluid resulting from pumping action of the motors E when the pump B is shut down. The valve F of Figs. 11 to 14 constitutes the braking means of my hydraulic propulsion and control system. The valve F includes a casing 104 having an interior space 105. The casing 104 is provided at respective opposite sides thereof with outwardly projecting tubular extensions 106 and 107 disposed in co-axial relation to each other and respectively defining a fluid inlet passage 106a and a fluid outlet passage 107a. The inlet and outlet passages 106a and 107a are respectively connected to the conduits 36 and 37. To facilitate connections to the conduits the outer ends of the tubular projections 106 and 107 are provided respectively with apertured flanges 106b and 107b. An elongated element 108 is contained within the interior space 105 of the casing 104 and at its respective ends extends into the inlet passage 106a and the outlet passage in co-axial relation therewith. To maintain the element 108 in said co-axial relation guide elements are provided at each end of the element 108 to work in the interiors of the tubular projections 106 and 107. The guide elements each consist of a flat ring 109 having therewithin a spider 109a secured at its free ends to the ring 109. Recesses 109b are formed in the legs of the spider element 109a and the portions of the ring 109 registering with the legs of the spider. The recesses 109b are radially disposed and open outwardly and each is provided with a plunger 110 therein for engagement with the interior periphery of the corresponding tubular projection 106 or 107. Helical compression springs 111 are disposed between the inner sides of the plungers 110 and the bottoms of the recesses 109b. The annular corner 112 consisting of the part of the casing 104 defining the inner end of the inlet passage 106a is utilized as a valve seat and suitable valve means for co-operating with the seat 112 is provided. The portion of the elongated element 108 adjacent the valve seat 112 is enlarged to provide a conical valve element 108a and a cylindrical element 108b disposed immediately inwardly of the valve element 108a. The valve element 108a is tapered toward the inlet passage 106a. It should be apparent that the flow of fluid through the inlet passage 106a will be diminished as the valve element 108a approaches the seat 112, and will be stopped when the valve element 108a has become engaged with the valve seat 112.

Means is provided for projecting the valve element 108a toward the valve seat 112. Inwardly of the cylindrical enlarged portion 108b of the elongated element 108 the element 108 is widened as indicated in Figs. 11, 12, and 13 to form a flat portion 108c adjoining the cylindrical enlarged portion 108b.

The upper wall 104a of the casing 104 is of increased thickness and is centrally apertured. A shaft 113 is journalled in the centrally apertured wall 104a of the casing 104 and carries on its inner end immediately adjacent the wall 104a a disk 114 which carries thereon an eccentrically located pin 115. A ball bearing 116 is provided, the inner race 116a of which is mounted on the pin 115 and the outer race 116b of which bears in a portion of its periphery against the inner side of the cylindrical portion 108b of the elongated element 108 therein. The dimensions of the parts associated with and adjoining the ball bearing 116 are such that the races 116a and 116b are confined between the disk 114 and the upper surface of the widened portion 108c of the elongated element 108. The shaft 113, when rotated to shift the eccentrically carried ball bearing 116 to the right, serves as an operating means for projecting the valve element 108a to the right so that the same will approach or engage the valve seat 112. When the shaft 113 is rotated so that the ball bearing 116 moves to the left, pressure of fluid in the inlet passage 106a will act upon the valve element 108a to cause the same to follow the ball bearing 116 and maintain the cylindrical enlargement 108b in engagement with the outer race 116b of the ball bearing 116. To prevent leakage of fluid from the interior of the valve past the shaft 113 a flanged sealing ring 117 is placed in an annular recess 118 in the outer portion of the wall 104a. The sealing ring 117 encircles the shaft 113 and is maintained in firm engagement therewith by means of an annular contractile element 119. The sealing ring 117 is secured in the recess 118 by means of an externally screw-threaded collar 120 screwed into internal screw-threads formed in the outer portion of the recess 118. Means for rotating the shaft 113 is provided. Outwardly of the wall 104a the shaft 113 is provided with a reduced dimension portion 113a on which an operating lever 121 is mounted. The operating lever 121 is secured to the shaft 113 by means of a nut 122 screwed on to screw-threads formed on the outermost portion 113b of the shaft 113. A washer 123 is interposed between the nut 122 and the outer side of the operating lever 121.

The wheel motors E may be of any type wherein the motor is reversible and rotates in directions corresponding to the direction of flow of fluid therethrough, wherein the construction is such that the motors can function as a pump and wherein the construction is such that substantially a fixed amount of fluid will flow through the motor per revolution thereof.

The pump B as previously mentioned may be of any type which is variable in regard to the output as expressed in the volume of fluid displaced thereby per revolution, and which is controllable to vary the output from a maximum down to zero output. In Fig. 1 I have represented the control element for varying the output of the pump B by a longitudinally movable rod 124. For operating the rod 124 I prefer to employ any suitable type of pneumatic means for producing mechanical movement responsive to application of vacuum thereto. In Fig. 1 I have indicated such means by the numeral 125. Suitable valve means is, of course, required for controlling application of vacuum to the vacuum actuated device 125. Valve means for this purpose is identified in Figs. 1 and 15 by the numeral 126. The vacuum control valve 126 should be constructed to afford both the function of shutting off the supply of vacuum to the pump adjusting device 125 and also through suitable means operating responsive to movement of the pump adjusting rod 124 to carry on the function of controlling communication of vacuum with the device 125 in such manner as to limit the degree of pump output. The device 126 is provided with a fitting 126a to which a conduit such as the conduit 126b leading to a source of vacuum is connected. The valve device 126 includes shut-off means for shutting off the supply of vacuum to the device 125 and opening the interior of the device 125 to the atmosphere. A control element 126c is provided for control of the vacuum shut-off means. The device 126 includes means operated by a rod 126d for respectively communicating vacuum with the device 125 and venting the device 125 to the atmosphere. The rod 126d carries an arm 126e to which the casing of an armored pull wire control element 126f is anchored. A guide rod 126g is provided on the device 126 and at its outer end projects through an aperture in an arm 124a carried by the pump adjusting rod 124. An element 126h is carried on the rod 126g in longitudinal relation thereto. The element 126h is adapted to be engaged by the arm 124a to cause movement of the rod 126d. The control wire 126j of the control means 126f is connected at its free end to the element 126h whereby the control means 126f may be operated to adjust the position of the element 126h on the rod 126g and thus determine the degree of pump output at which the arms 124a will engage th element 126h to move the rod 126d and thus control the degree of vacuum in the device 125 so as to prevent further increase in the output of the pump B.

The engine 28 includes an intake manifold 28a of conventional type upon which is mounted a carburetor 127 having a throttle operating lever 127a. For control of the throttle lever 127a I provide a vacuum actuated device H shown in Figs. 15 and 16. The device H includes an apertured mounting element 128 which may be secured to any stop supporting means such as a part of the engine 28. Carried by the mounting element 128 is a body 129 including a lower tubular element 129a, respective ends of which are connected through tubes 126b and 131 respectively to the fitting 126a on the vacuum control valve 126 and to the intake manifold. The body 129 includes an upper portion 129b which is generally of tubular form so as to constitute a cylinder having a chamber 129c therewithin. A passage 132 is provided connecting the lower tubular element 129a with the left-hand end of the space 129c. The right-hand end of the cylinder element 129b is provided with an apertured end wall 129d. The left-hand end of the cylinder element 129b is provided with a screw-threaded elongated plug 133 screw-threadedly engaged in the left-hand end of the cylinder element 129b. The plug 133 is provided with a head 133a by means of which the plug 133 may be adjustively screwed inwardly and outwardly of the cylinder element 129b. A lock nut 134 is provided on the plug 133 for locking the same in any desired adjusted position thereof. In its medial and inner end portions the plug 133 is provided with a cylindrical inwardly opening recess 133b. A piston 135 is placed in the space between the plug 133 and the end wall 129d. At its left-hand end the piston is provided with a cylindrical leftwardly opening recess 135a. A helical compression spring 136 extends between the plug 133 and the piston 135 and is seated at its respective ends in the respective recesses 133b and 135a. The piston 135 carries thereon a reduced diameter portion 135b extending to the right through the aperture of the apertured end wall 129d and constituting a piston rod. The outer end of the piston rod 135b is connected to the throttle arm 127a by a link 137 which is pivotally connected at its respective ends to the piston rod 135b and the throttle arm 127a. A flexible cup 138 is provided as shown in Fig. 16 to serve as a dust shield for preventing entrance of dust into the portion of the piston rod 135b which moves in the apertured end wall 129d. The above described throttle control device shown in Fig. 16 is so arranged that the same will act when the vacuum in the intake manifold 28a decreases and increases to respectively increase and decrease the degree of throttle opening of the throttle included in the carburetor 127 and controlled by the throttle arm 127a. The throttle control device H shown in Fig. 16 working in co-operation with the vacuum control valve 126 is adapted more particularly for use in connection with my system when the motors E will normally be operated continuously at a fixed speed. Assuming a normal degree of vacuum in the manifold 28a and the normal load on the motors E the throttle arm 127a will be disposed at a certain position. If the load on the motors E increases there will be a tendency to increase the torque imposed on the engine 28 with the result that the engine will slow down somewhat and the degree of vacuum in the manifold 28a will be reduced. Reduction of vacuum in the manifold 28a will cause the device H to increase the degree of throttle opening and simultaneously will operate the device 125 to decrease the volume of liquid displaced by the pump B per revolution. This will in effect increase the ratio between the revolutions of the engine 28 and the revolutions of the wheel motors E. Reduction in torque occasioned by the increase in ratio and the increase in throttle opening caused by reduction in manifold vacuum will cause the engine 28 to speed up so that the speed of rotation of the motors E will remain substantially the same as before the increase in load and the torque developed by the motors E will be increased. When the load is again decreased the vacuum in the manifold 28a will increase to effect reduction in throttle opening by means of the device H and to increase the volume of fluid displaced per revolution by the pump B through action of the device 125. Thus the ratio between the revolutions of the engine 28 and the revolutions of the motors E and also the degree of throttle opening will return to normal when the load on the motors E has returned to normal.

Control means to be operated by the driver of a vehicle in which my system is included are provided as shown in Figs. 17 and 18. In Fig. 17 the numerals 139 and 140 designate the respective floor board and toe board ordinarily found forward of the driver's seat in an automotive vehicle. A foot operated control element 141 is provided in the position occupied by the clutch pedal. The control element 141 may be in the form of a plate connected at its lower end to the toe board 140 by means of a hinge or pivot device 141a. A curved rod 142 extends through an aperture 140a in the toe board 140 and at its upper end is pivotally connected to the upper end of the control element 141. A helical spring 143 is placed on the rod 142 between the toe board 140 and the plate 141 so as to normally hold the plate 141 in upwardly and rearwardly deflected position. The lower end of the rod 142 is pivotally connected to one arm 144a of a bell crank 144. The bell crank 144 is pivotally mounted on a bracket 145 secured to the lower side of the toe board 140. The remaining arm 144b of the bell crank 144 is connected through a link 146 to the forward end of a rod 147, this rod 147 being forwardly and rearwardly slidable in a tubular guide element 148 which is secured to the lower side of the floor board 139. The control element 126f is anchored in the rear end to the tubular guide 148. The longitudinally slidable wire 126j of the control element 126f is connected to the slidable rod 147. When the control element or pedal 141 is pressed downwardly the wire 126j will be pushed toward the vacuum control device 126 and will push the element 126h toward the pump B so as to limit the degree to which the volume of fluid displaced by the pump B per revolution may be increased. Pressing the pedal 141 all the way down will cause the output of the pump B to be reduced to zero, thus affording an action in my system corresponding to disengagement of the clutch of a conventional motor vehicle. Referring to Fig. 18 a control rod 149 extending longitudinally of the vehicle is shown. The forward end of the control rod 149 may be connected to a pedal similar to the usual motor vehicle brake pedal and similarly situated. The connection of the rod 149 to a brake pedal should, of course, be such that movement of the rod 149 responsive to depressing the brake pedal will be toward the left as viewed in Fig. 18. The rear end of the rod 149 which is the right-hand end as viewed in Fig. 18 is connected to the operating lever 121 of the brake valve F previously described. An apertured element 150 is mounted on the arm 121 and the rod 149 is extended through the aperture thereof. Forwardly of the element 150 a collar 151 is secured on the rod 149. The rear end of the rod 149 is screw-threaded and carries thereon a wing nut 152. A helical compression spring 153 is placed on the rod 149 between the wing nut 152 and the apertured element 150. Pressure applied to the brake pedal is transmitted through the wing nut 152 and the spring 153 to the element 150 so as to move the arm 121 in such direction as to cause the valve element 108a of the brake valve to move toward the valve seat 112 of the brake valve F. Release of the brake pedal which, of course, should be provided with the usual pedal return spring will cause the collar 151 to return the brake valve operating lever 121 to the normal position thereof. The valve of the device 126 which disconnects the device 125 from the source of vacuum and opens the device 125 to the atmosphere is also actuated to carry out its function responsive to the depression of the brake pedal, that is, forward movement of the rod 149. The armored pull wire control element 126c controlling the valve mentioned is anchored at the end thereof opposite the device 126 in the rear end of a tubular element 154 which is supported from the frame 125 of the vehicle by means of a bracket 155. Within the tubular element 154 is a rod 156 which is slidable longitudinally of the tubular element 154. The pull wire 126k of the control element 126c is connected to the slidable rod 156. The brake operating rod 149 carries thereon an apertured arm 157 through the aperture of which the rod 156 extends. The forward end of the rod 156 has a collar 158 secured thereon. A helical compression spring 159 is placed on the rod 156 between the collar 158 and the arm 157 so as to bear at its respective ends against the collar 158 and the arm 157. Forward movement of the brake rod 149 for producing braking action is transmitted through the arm 157, the spring 159, the collar 158, and the rod 156 to the pull wire 126k to cause shutting off of vacuum from the device 125 and connection of the device 125 to the atmosphere. This will cause reduction of the output of the pump B to zero.

In motor vehicles called upon for operation at variable speeds a means of operating the throttle arm 127a somewhat different from the means H shown in Fig. 15 is provided. The different means is shown in Fig. 19. A rod 160 is provided and may be connected at its forward end to a foot throttle or accelerator pedal of conventional design and situated in the manner of the usual motor vehicle accelerator pedal. The rod 160 is so associated with the accelerator pedal that depressing of the pedal will move the rod 160 to the left as viewed in Fig. 19. The rear end of the rod 160 is pivotally connected to one arm 161a of a bell crank 161 which is mounted for swinging movement about a fixed pivot pin 162. The remaining arm 161b of the bell crank 161 has pivotally connected thereto a rod 163. A vacuum actuated device J is provided having a cylinder element 164, a piston element 165, a spring 166, a screw-threaded plug 167 and a lock nut 168, all constructed and arranged similar to the parts of the upper portion of the device H shown in Fig. 16. The rod 163 is connected with the plug 167 so as to permit rotation of the plug 167 relative thereto but, however, is associated with the plug 167 so as to be restrained from longitudinal movement relative thereto. A piston rod 169 is provided on the piston 165 and the free end of the rod 169 is pivotally connected to the throttle operating arm 127a of the carburetor 127. The device J is not mounted in a fixed position but is supported from the rods 163 and 169. A connection element 170 communicating with the left-hand portion of the space within the cylinder element 164 and adapted for connection of a suitable conduit thereto is provided. A flexible conduit or tube 171 is provided to connect the connection element 170 to the intake manifold 28a so that vacuum produced in the intake manifold 28a will be in communication with the interior of the device J. In use of the device J the degree of throttle opening is determined largely by the position of the accelerator pedal and with the accelerator pedal in a given position the degree of throttle opening will be varied to a relatively small extent by the vacuum actuated device J. This results in partial control of the degree of throttle opening to compensate for variation in the load on the motors E. The vacuum control valve 126 associated with the pump output control device 125 is arranged in the same manner when the device J is used as it would be arranged when the device H is used and accordingly provides for the same control of the ratio between the revolutions of the engine 28 and the revolutions of the motors E.

The lever 84 for operating the reversing and parking brake valve may be connected through any suitable mechanical means of conventional type to an operating lever of suitable form situated for convenient access thereto by the operator of the vehicle.

My system of hydraulic propulsion braking and control requires no mechanical connections between the frame 25 or mechanism carried thereby and the wheels of the vehicle and hence enables inclusion in a motor vehicle chassis provided with my system of wheel suspension means of a novel and improved nature co-operating with my hydraulic device to produce a highly desirable unitary result. At each end of the frame 25 I provide a pair of axles 172 each of which is pivotally connected at one end thereof to a member 173 mounted on one side of the frame 25 and extends at its free end portion 172a beyond the opposite side of the frame 25. The axle members 172 are so shaped as to extend from the member 173 downwardly and toward the center of the frame and then at a gradual incline to the free end 172a. The medial portions of the members 172 are so bent as to enable the same to cross with clearance therebetween and the free end portions 172a of the respective axles 172 are aligned transversely of the frame 25. Radius rods 174 are connected to the free end portions 172a of the respective axles 172 by means of bolts 175 extending through the axle 172 and through a pair of spaced projections 174a provided on the end of the radius rod 174 and disposed respectively above and below the axle 172. From the axle 172 the radius rods 174 extend a substantial distance toward the middle portion of the frame 25 and are at their free ends provided with ball and socket connecting means 176 connecting the radius rods 174 to the frame 25. The free ends 172a of the axles 172 are connected to the frame 25 through resilient means so that the axles 172 may be deflected vertically upwardly and downwardly relative to the frame 25. Cantilever type leaf springs 177 are anchored at their normally fixed ends to the extreme ends of the frame 25 by means of suitable clamps 178. The free ends of the springs 177 are connected to the radius rods 174 closely adjacent the axles 172 by means of shackles 179 which may be of substantially conventional construction. Snubbers or shock absorbers 180 which may be of conventional design may be connected between the free end portions 172a of the axle members 172 and suitable brackets 180a mounted on the frame 25. At the forward end of the vehicle steering knuckle assemblies 181 are provided on the respective free end portions 172a of the forward pair of axle members 172. The steering knuckles 181 carry plates 181a on which two of my motors E are mounted. As previously described tires 26 and rims therefor are carried by the rotatable portions of the motors E. The steering knuckle assemblies 181 carry steering arms 181b which are connected through steering links 182 to the rear arm 183a of a double arm steering lever 183. The links 182 are, of course, pivotally connected at their ends to the steering arms 181b and the steering lever 183. The forward arm 183b of the steering lever 183 is connected through a link 184 to the swingable steering element 185a of a conventional steering head 185 which is connected through a steering shaft 186 to a conventional steering wheel 187. On the rear pair of axle members 172 steering knuckles are not necessary and hence the plates 181a upon which the wheel motors E are mounted may be rigidly mounted directly on the free end portions 172a of the rear axle members 172. The construction just described provides knee action or independent springing of each and every one of four wheels of a vehicle, and propulsion and braking action of the wheels 26 is provided through my hydraulic means which require connections between apparatus on the frame 25 and the wheel motor units E of a flexible nature. The use of flexible conduits in place of brake rods and axle shafts makes possible the wheel suspension construction described.

In my hydraulic propulsion system having four hydraulic wheel driving motors differential action when the vehicle is following other than a straight path is inherently provided since the motors have individual parallel paths therethrough between which the total output of the pump B may be divided either equally or unequally as conditions require. The fluid used in my system is preferably of such nature as to have lubricating ability whereby the working parts of the pump, wheel motors, speedometer drive motor and other devices in the system are lubricated without the need for any equipment specifically for providing lubrication. Drain plugs and air bleeding plugs may be provided at various points in the system as desired in accordance with usual practice in hydraulically operated equipment. In use of the system the engine 28 may be started by starting equipment identically like that found in conventional motor vehicles. During the process of starting the engine either the brake pedal or the pedal 141 may be depressed to adjust the pump B for zero output, or the control element for the reversing and parking brake valve D may be placed in parking position so as to bypass fluid from the outlet back to the inlet of the pump B. Until the engine has started and vacuum has been built up in the intake manifold the pump adjusting device 125 will function to maintain the pump B adjusted for zero output.

After the engine has been started and it is desired to place the vehicle in motion the reversing valve D will ordinarily be in parking position and preferably the pedal 141 will be in depressed position. The reversing valve may then be shifted to either forward or reverse position if desired. The accelerator pedal should ordinarily be slightly depressed and the pedal 141 may be permitted to rise a short distance from its fully depressed position. Through operation of the vacuum control valve 126 and the pump adjusting device 125 the pump B will then be adjusted for a relatively low displacement of fluid per revolution, and hence the ratio between the engine revolutions and the revolutions of the wheel motors E will be large and the transmission of power from the engine to the wheel motors will be under conditions corresponding to use of the low gear in the conventional motor vehicle transmission. As the pedal 141 is subsequently allowed to rise farther and farther the gear ratio effect of the hydraulic transmission system will be gradually varied by extremely small increments toward a condition corresponding to that existing in a conventional motor vehicle when the transmission thereof is in high gear. The change in transmission ratio just mentioned is brought about by operation of the vacuum control valve 126 and the pump adjusting device 125 acting under the control of the pedal 141 to increase the volume of liquid displaced per revolution by the pump B. The accelerator is, of course, operated to supply the required amount of combustible mixture to the engine 28. In ordinary travel of the vehicle when the same encounters a hill the device 125 will act to increase the transmission ratio between the engine and the wheel motor and the device J will act to produce a moderate increase in throttle opening. Operation of the device J may, of course, be augmented by increased pressure on the accelerator pedal. When it is desired to permit the vehicle to coast the accelerator pedal may be released to return to the position thereof corresponding to closure of the throttle. The engine 28 will be reduced in speed down to an idling speed and the output of the pump B will be greatly diminished. The vehicle will continue to coast because of the free-wheeling effect permitted by raising of the ball 101 in the excess pressure release and free-wheeling valve C. If desired the pedal 141 may be depressed to close off the pump B. If it is desired to slow down the vehicle rapidly or stop the vehicle the brake pedal may be operated to restrict or stop flow of fluid through the wheel motors E. When the vehicle has been stopped the reversing valve D may be placed in parking position in order to permit idling of the engine 28.

It is to be pointed out that the motor conduits 32 and 33 may, if desired, have fluid motors other than the motors E connected thereto. Such motors may be stationary motors, as for example, motors to operate a winch carried by the vehicle. In such case it would, of course, be desirable to provide stop valves in the fluid path to the stationary motor and provide other valves for shutting off flow of fluid to the wheel motors E. Where a trailer is used with the vehicle, wheel motors similar to those used in the vehicle itself may be provided in connection with the wheels to the trailer. Flexible conduits may be extended from the motor conduits 32 and 33 to the trailer, and the wheel motors associated with the trailer wheels. In such case the motor 28 will apply tractive effort not only to the wheels of the vehicle itself but also to the wheels of the trailer. Furthermore, use of the brake valve of the vehicle will cause braking action not only on the wheels of the vehicle but also on the wheels of the trailer. My system is also well adapted for use in transmitting power from an engine or any other source of rotary mechanical power to fluid motors in equipment of a different nature than vehicles.

It is apparent that I have invented a novel, effecitve and efficient hydraulically operated system for propulsion, braking and control of motor vehicles.

It will, of course, be understood that various changes may be made in the form, details, arrangement and proportions of the various parts without departing from the scope of my invention.

What is claimed is:

1. In a hydraulic vehicle propulsion system including a power driven fluid pump having an outlet conduit running to the inlet of a fluid motor equipped with an outlet conduit in which a braking valve is interposed, a fluid reservoir to which said motor outlet is connected for delivery of fluid thereinto, said reservoir having free communication with the outer atmosphere, a pump bypass conduit running from the lower portion of said reservoir to said pump outlet conduit, a check valve in said bypass conduit for permitting flow of fluid therethrough only toward said pump outlet conduit, and an inlet conduit for said pump connected to said reservoir at a point higher than the point of connection of said bypass conduit, whereby an abnormal drop of the liquid level in said reservoir will expose said pump inlet connection and halt the supply of power to said fluid motor, but said bypass connection will remain covered and permit functioning of said brake valve.

2. A hydraulic vehicle propulsion system including, a reversible, wheel-driving hydraulic motor having a pair of fluid ports one or the other of which functions as a fluid inlet port dependent upon the direction of rotation desired and the remaining one of which functions as a fluid outlet port, a fluid pump having a fluid inlet and a fluid outlet, means for driving said pump, a fluid reservoir communicating in the upper portion thereof with the surrounding atmosphere and being adapted to be partially filled with fluid, a value, a pair of conduits connecting the respective ports of said motor with said valve, a conduit connecting the outlet of said pump with said valve, a fluid return conduit for delivering return fluid from said valve into said reservoir, a conduit connecting the lower portion of said reservoir to the inlet of said pump, an auxiliary fluid motor connected in series with said return conduit to be operated by fluid flowing therethrough and positioned between said valve and said reservoir, and rotational speed indicating means driven by said auxiliary motor to indicate approximately the rate of fluid flow through said return conduit.

HERBERT J. NATHAN.